(12) United States Patent
Schlegel et al.

(10) Patent No.: US 11,774,175 B2
(45) Date of Patent: Oct. 3, 2023

(54) DENTAL FURNACE

(71) Applicant: Ivoclar Vivadent AG, Schaan (LI)

(72) Inventors: Manuel Schlegel, Mels (CH); Rudolf Jussel, Feldkirch (AT)

(73) Assignee: Ivoclar Vivadent AG, Schaan (LI)

( * ) Notice: Subject to any disclaimer, the term of this patent is extended or adjusted under 35 U.S.C. 154(b) by 1067 days.

(21) Appl. No.: 16/382,896

(22) Filed: Apr. 12, 2019

(65) Prior Publication Data

US 2019/0316843 A1 Oct. 17, 2019

(30) Foreign Application Priority Data

Apr. 16, 2018 (EP) ..................... 18167529

(51) Int. Cl.
| | |
|---|---|
| *F27B 17/02* | (2006.01) |
| *A61C 13/20* | (2006.01) |
| *F27B 5/10* | (2006.01) |
| *F27D 11/02* | (2006.01) |
| *H05B 3/62* | (2006.01) |

(52) U.S. Cl.
CPC ............ *F27B 17/025* (2013.01); *A61C 13/20* (2013.01); *F27B 5/10* (2013.01); *F27D 11/02* (2013.01); *H05B 3/62* (2013.01)

(58) Field of Classification Search
None
See application file for complete search history.

(56) References Cited

U.S. PATENT DOCUMENTS

| | | | |
|---|---|---|---|
| 5,965,051 A * | 10/1999 | Hirayama | ............ C04B 35/645 219/553 |
| 2009/0225806 A1 | 9/2009 | Lorunser et al. | |
| 2012/0118875 A1 | 5/2012 | Jussel | |
| 2012/0168431 A1 * | 7/2012 | Sundberg | ............... C04B 35/18 373/117 |
| 2016/0113062 A1 * | 4/2016 | Gotoh | ...................... H05B 3/66 219/531 |
| 2019/0316843 A1 * | 10/2019 | Schlegel | ............... A61C 13/08 |

FOREIGN PATENT DOCUMENTS

| | | |
|---|---|---|
| CN | 103954128 A | 7/2014 |
| DE | 19746872 A1 | 5/1999 |
| KR | 101848316 B1 | 4/2018 |
| WO | WO-2010128935 A1 * | 11/2010 ............ C04B 35/18 |

\* cited by examiner

*Primary Examiner* — Scott R Kastler
(74) *Attorney, Agent, or Firm* — Ann M. Knab; Thad McMurray

(57) ABSTRACT

The invention relates to a dental furnace, in particular a high-temperature dental furnace for oxide ceramics such as zirconium dioxide with sintering temperatures of between 1350° C. and 1650° C., having heating elements (14, 16) which are intended to give off heating energy to a firing chamber (12) in the dental furnace (10). The heating elements (14, 16) are configured as electrical resistance heating elements and supported below the firing chamber (12) each by means of at least one heating element support foot (18). The heating elements (14, 16) extend vertically to the top starting from the heating element support feet (18) and at the top, end in an arch (46), in particular in a semicircular arch or possibly in a pointed arch, without an upper lateral support, in particular not in the region of the arch (46).

17 Claims, 3 Drawing Sheets

DENTAL FURNACE

CROSS-REFERENCE TO RELATED APPLICATIONS

This application claims priority to European patent application No. 18167529.9 filed on Apr. 16, 2018, the disclosure of which is incorporated herein by reference in its entirety.

TECHNICAL FIELD

The invention relates to a dental furnace for heating ceramics.

BACKGROUND

Typically, dental restoration parts are produced by heat treatment. Dental furnaces having a firing chamber in which frequently several dental restoration parts may be fired at the same time serve to heat the dental restoration parts.

In many cases, the dental restoration parts consist of specific dental ceramics such as lithium disilicate or zirconium dioxide and require a specific firing curve to be able to provide for the desired properties.

To achieve a good firing result it is required with furnaces of this kind to adhere to an exact temperature profile.

Not so long ago, cycle times of several hours, for instance eight hours, were required for this purpose.

Recently, tests have been carried out to significantly reduce the cycle time. For this purpose, a larger heating rate and a larger cooling rate have been used. Due to the introduced thermal stress, both are critical.

To achieve a larger heating rate it has been suggested to reduce the volume of the firing chamber and thus the thermal capacity to be heated. However, there are limits in this respect in case of the use of large dental restoration parts.

In addition, it is more efficient to use a firing furnace having one firing chamber instead of several in parallel when several dental restoration parts are to be produced.

Recently, zirconium dioxide has been used preferably as a material for dental restorations due to the good mechanical and aesthetically very satisfying restoration results. It requires processing temperatures of up to 1600° C. Accordingly, the heating elements used for a furnace of this kind do not only have to be temperature-resistant up to a temperature of 1600° C. but to considerably higher temperatures, for instance up to 1800° C.

Molybdenum disilicide has proven to be a comparatively cost-effective material for the heating elements.

The operation of heating elements of this kind is strictly regulated due to the softening occurring at temperatures of more than 1600° C.

This also holds true for the type of installation and the support of the heating elements. Comprehensive series of tests that have been carried out to enable the use of heating elements also slightly below their melting temperatures have shown that it is required either to support the heating elements or at least to not subject them to bending in the softened state.

Leading manufacturers of heating elements made of molybdenum disilicide of this kind produce holding elements of this kind with different shapes. For instance, arch-shaped heating elements are recommended which are to be attached in a suspended fashion such that only tensile forces but no bending forces arise. Alternatively, lateral supports may also be used to avoid occurrence of bending loads in this respect.

However, lateral supports have the disadvantage that then the heating element is always subjected to mechanical stress. The occurrence of a relative movement between the support and the heating element may not be avoided. This relative movement will then lead to friction and thus to mechanical impairment of the heating element.

Because of the high-temperature operation, molybdenum disilicide suffers from degradation. An oxide layer ($SiO_2$) forms which may flake off, thus exposing the original molybdenum disilicide. The oxide layer is vital for the heating element and after flaking off a new layer of a high-temperature-resistant $SiO_2$ surface must be built up.

This mechanism is disturbed by lateral contact.

It has been suggested to use exceptionally short heating elements which are for instance only 3 cm long and thus mechanically more stable with respect to the support at the connections. However, this solution has not proven to be practical as due to the small surface of the heating elements the surface load of the heating elements will then be too high.

The connections could be cooled intensively in order to keep them at a temperature of, for instance, 150° C. or below but this would be extremely unfavorable from an energetic point of view and additionally its realization in the vacuum chamber would be difficult and expensive.

SUMMARY OF THE INVENTION

In contrast, the invention is based on the task of providing a dental furnace in accordance with the claims, which is considerably improved with respect to energy efficiency particularly in the high-temperature region.

According to the invention, it is provided, contrary to manufacturers' recommendations, to implement the heating elements as upright elements, namely supported on the heating element support feet. Then, the heating element support feet may be operated with a large temperature gradient such that the connections are at a low temperature and the upper ends of the support feet at a high temperature which is similar to that of the heating element.

The heating elements are configured as electrical resistance heating elements and are supported below the firing chamber each by means of at least one heating element support foot.

The heating elements themselves may then be realized in the shape of an arch as is known per se in case of suspended heating elements. They are free from a lateral support.

With the help of the inventive solution, cooling of the connections and thus energy dissipation may be avoided completely in this respect. In addition, the problems regarding the connections disposed at the top may be avoided. Up to now, lines that were to be suitable to conduct, for instance, 100 amperes or even several 100 amperes had to be led to the connections of suspended heating elements disposed at the top. Even in case of a large cross section of the line, large losses occurred because of the long lines in this respect, as the power electronics which are in close connection with the control electronics of a dental furnace must be disposed in the base of the furnace due to the operating elements which are desired down there and for thermal reasons; if the power electronics were disposed at the top, additional cooling would be required due to the heat rising from the firing chamber and a top-heavy furnace would be produced which is technically unfavorable.

According to the invention, it is provided to realize the heating elements free from lateral support. This ensures that the oxide layer protecting the heating element is not mechanically loaded and damaged additionally.

The heating element arches may be comparatively short which proves advantageous for mechanical stability. With respect to the special heating element support feet in accordance with the invention, a plurality of heating elements may be disposed around the firing chamber in any desired suitable manner. In contrast to the solution according to the state of the art, this does not lead to an unfavorable solution from an energetic point of view as every heating element may give off heat specifically at that position at which it is necessary, namely on the side of the firing chamber.

While the realization of the upper end of the heating element as an arch is preferred, for instance as an elliptical or semicircular arch, it is also possible to dispose a welded joint at the top such that a pointed arch in the manner of a Gothic window is produced. Even if the welded joint presents certain, albeit small additional weight, it leads to stiffening of the heating element at this position.

The geometric dimensions of both the heating element and the heating element support foot may be adapted to the requirements to a large extent. In case of compact dental furnaces with comparatively small firing chambers, a height of the heating elements of, for instance, 60 mm—as viewed from the transition to the heating element support foot up to the upper end of the arch—may be pursued. Then, the heating element support foot may have a length of, for instance, 120 mm each such that a comparatively large height is available for provision of the desired temperature gradient.

The heating elements extend from the support feet towards the top in a self-supporting manner. If an angular deviation from the vertical is produced, it is preferably smaller than 5 degrees such that the heating element does not tend to tilt.

According to the invention, it is also favorable if the heating element comprises a diameter of at least 2 mm.

In an advantageous development of the invention, it is provided that the heating element support feet comprise a temperature gradient of in particular more than 50 degrees per cm along their extension from the electrical connections to the heating elements.

In an advantageous development of the invention, it is provided that the heating element support feet are cooled at least in their region close to the connections, in particular by air and/or by means of cooling ribs or by any desired, in particular liquid, heat exchanger medium.

In an advantageous development of the invention, it is provided that a vacuum may be applied to the dental furnace, in particular including the heating elements.

In an advantageous configuration of the invention, it is provided that the heating elements subsequent to the heating element support feet comprise a conically tapering transition area which takes up at least a twentieth part, in particular at least a tenth part of the extension of each heating element.

It is to be understood that instead the transition area may also have any other desired shape. For instance, the heating elements may be attached to a flat upper end of the support feet. Alternatively, the attachment may also be realized on an inclined end at the top of the support feet. In addition, it is possible to realize the connection in one piece, or by means of welding.

In a further advantageous configuration of the invention, it is provided that the cross-sectional areas of the heating element support feet decrease from the transition areas to the heating elements monotonically, in particular strictly monotonically.

In an advantageous configuration of the invention, it is provided that the support feet and the heating elements including their transition areas consist of the same material and comprise different cross-sectional areas.

In a special configuration of the inventive solution, the dental furnace may be charged from above. A charging base may be moved vertically and the rest of the furnace comprises a vertical channel through which the charging base may be moved from the bottom towards the top and vice versa. The heating elements are disposed at medium height of this channel and the channel may be closed at the top by means of a lid.

According to the invention, especially a presentation furnace of this type may be combined particularly favorably with the inventive heating elements with heating element support feet as a furnace of this type is particularly suitable for a comparatively small firing chamber wherein for different reasons the electrical connections must be disposed in the furnace base. A furnace of this kind is particularly favorable as a chairside furnace in a dental practice. The heating element support feet may be colder than 800° C.

The inventive heating elements may extend circularly around the firing chamber together with their associated support feet, respectively. Here, any desired geometric arrangements of the ring are conceivable, for instance also polygons or asymmetric arrangements. Copending commonly owned U.S. application Ser. No. 16/182,662 directed to a dental furnace having heating elements is hereby incorporated by reference.

BRIEF DESCRIPTION OF THE DRAWINGS

Further advantages, details and features may be taken from the following description of an exemplary embodiment of the invention in conjunction with the drawings.

DETAILED DESCRIPTION

Figure 1:
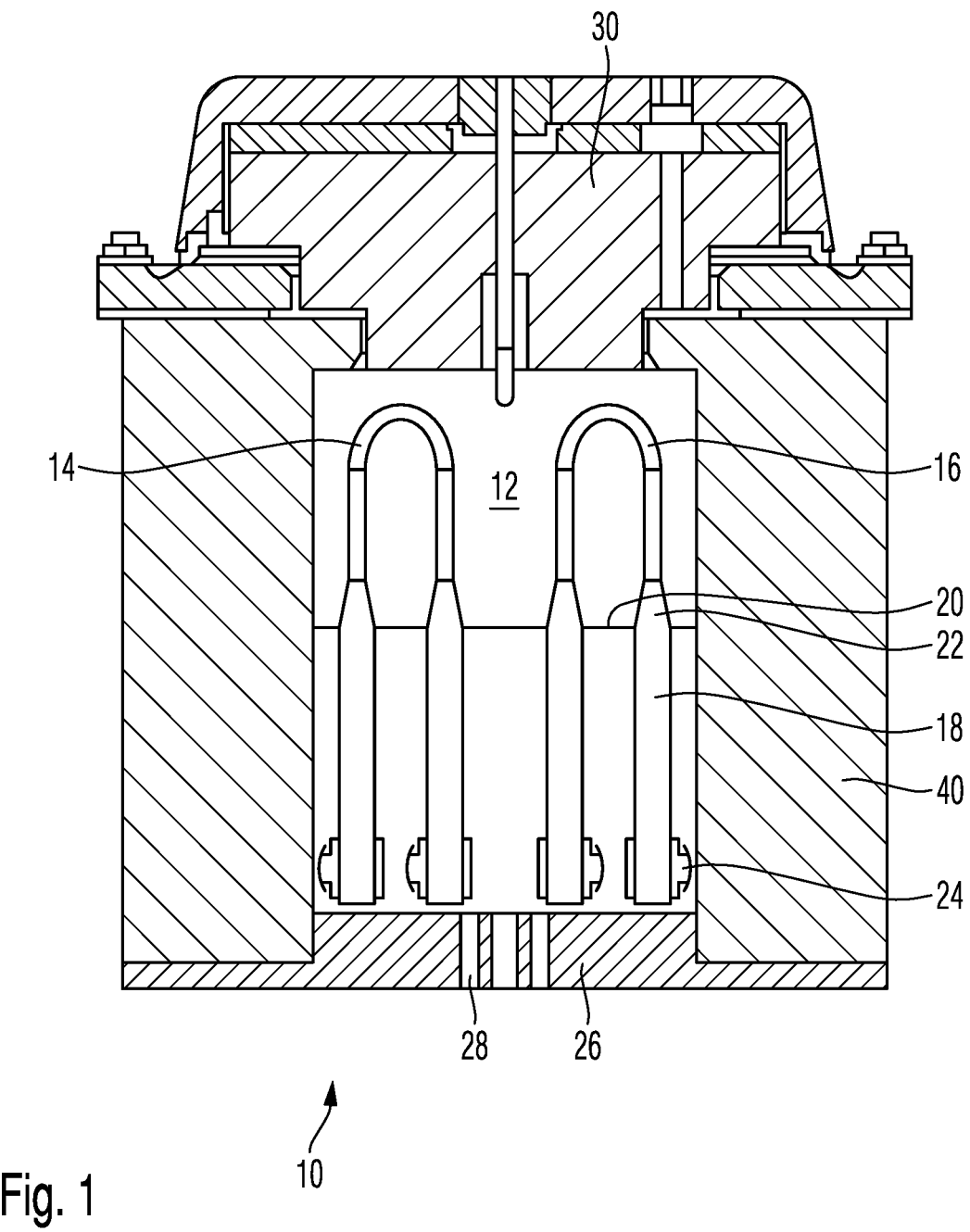
FIG. 1 shows a schematic view of an embodiment of an inventive dental furnace.

In the embodiment according to FIG. 1 a dental furnace 10 is provided. It comprises a firing chamber 12 which is surrounded by a plurality of heating elements. In FIG. 1 both heating elements 14 and 16 are illustrated.

The heating elements extend over a large part of the height of the firing chamber 12. They are supported by heating element support feet 18, wherein every heating element 14 extends in the manner of an upturned U at the top and is supported by two support feet 18.

The heating element support feet 18 pass through a firing chamber bottom 20. They extend over a considerable height which amounts to almost double the height of the heating elements 14 and 16 in the exemplary case.

The heating element support feet 18 comprise a transition area 22 to support the heating elements 14 and 16. It offers the possibility to adapt the shape of the cross section of the support feet 18 to that of the heating elements 14 and 16. In the exemplary case, one circular cross section each is provided and the transition areas are conical or frusto-conical.

It is to be understood that instead any other desired cross section is possible.

The heating element support feet 18 comprise electrical connections 24 at their lower ends. There, they are comparatively cool, for instance, approximately 200° C., and in the region of the bottom 26 of the furnace 10 cooling air openings 28 are provided which continue to cool the connections 24.

The top of the firing chamber 12 may be closed by a lid 30. The firing chamber bottom 20 may be moved vertically. After lifting or swiveling away of the lid 30, the firing chamber bottom 20 may be lifted through the lid opening such that the objects to be fired which are located thereat, such as dental restoration parts, may be removed and such that the furnace may be loaded with new objects.

In the exemplary embodiment illustrated, the heating elements 14 and 16 are disposed around the circumference of the firing chamber 12.

Outside of the heating elements 14 and the heating element support feet 18 a thermal insulation 40 is provided. It may also comprise grooves in which the heating elements 14 and the support feet 18 are received.

In addition, the heating elements 14 may be covered with a temperature-resistant protective material in a way known per se to protect the firing chamber against particles and/or gases coming off of the heating elements.

Figures 2, 3:
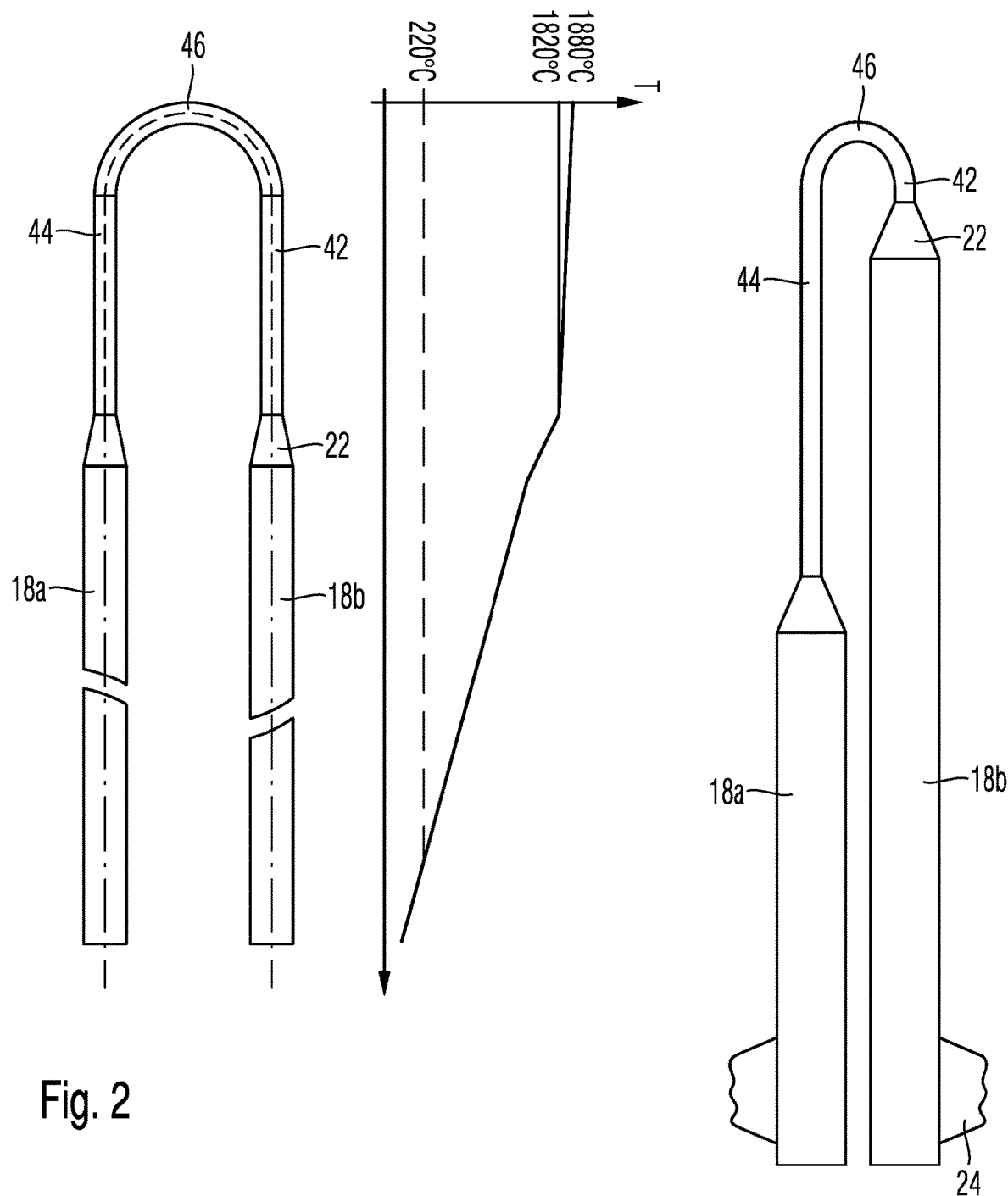
FIG. 2 shows a side view of an inventive heating element with the associated support foot and a drawn in temperature gradient for an inventive dental furnace.
FIG. 3 shows a schematic view of a further embodiment of an inventive heating element with support foot.

One embodiment of an inventive heating element 14 is apparent from FIG. 2. The heating element 14 comprises two side legs 42 and 44 which are connected with one another via an arch leg 46.

The side leg 44 is connected with the support foot 18a via a transition area 22 and supported thereon, and the side leg 42 is connected with the support foot 18b via the transition area 22.

The arch leg 46 is approximately as long as the side legs 44 and 42. Accordingly, it comprises a comparatively large radius. Due to the electrically shorter way—and thus the smaller resistance—the inside of the arch leg 46 becomes comparatively hot.

In order to compensate for this, a vertically oval cross section of the arch leg 46 is provided in a modified configuration of the inventive heating element. In this embodiment, the outside of the arch leg 46 is quasi elongated and cooler such that basically the inside is suspended on the outside.

It is to be understood that the oval cross section may also continue into the region of the side legs 42 and 44 in any desired way.

The outside of the arch leg 46 is always cooler than the inside, also in case of a circular cross section, due to the higher electrical resistance thereof compared to the inside.

According to the invention, the hottest part of the heating element 14 is always carried by the colder outside. In this respect, the hottest part of the heating elements is quasi suspended virtually in spite of the upright arrangement of the heating elements.

The arch diameter of the arch leg 46 amounts to approximately six times the diameter of the heating element 14. The transition area 22 comprises a height which corresponds to approximately three times the diameter of the heating element 14.

The diameter of the support foot 18a and of the support foot 18b also amounts to approximately three times the diameter of the heating element 14. The length of the support feet 18 may be adapted to the requirements, that is to say the spatial dimensions in the dental furnace, in any desired way.

In any case, the electrical connections 24 are provided at the bottom. In a way known per se, they comprise clamps which surround the lower regions in the support feet 18 in a clamping manner by means of screw connections and which ensure low current density thereat due to the large contact surface.

The temperature of the heating element and of the support feet is illustrated schematically on the right-hand side in FIG. 2. The heating element comprises a temperature which increases slightly towards the top, approximately 1800° C. In the transition area 22 it is already considerably lower and towards the bottom end of the support feet 18 it decreases to values which allow for contact with an electrical connection.

A further modified configuration of an inventive heating element 14 is apparent from FIG. 3. In this embodiment, the support foot 18b is considerably longer than the support foot 18a and, accordingly, the side leg 42 is considerably shorter than the side leg 44.

In this embodiment, the combination of arch leg 46 and side leg 42 quasi carries the side leg 44 such that a virtually suspended configuration is realized, in spite of the physically upright realization.

Different possible relative arrangements of the heating elements to the firing chamber 12 are apparent from FIG. 4. They are to be understood only exemplarily.

Figure 4A:
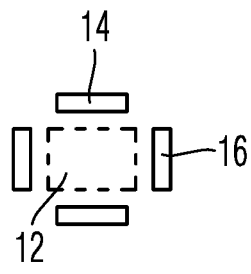
FIGS. 4A to 4F show schematic views of possible arrangements of heating elements around a firing chamber in an inventive dental furnace.

FIG. 4A shows a rectangular firing chamber 12 around which four heating elements 14 and 16 are arranged symmetrically. The firing chamber 12 could also be configured circularly or with rounded corners in this embodiment.

Figure 4B:
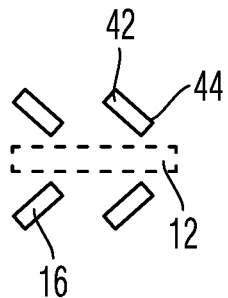

The embodiment illustrated in FIG. 4B comprises four heating elements 14 and 16 which extend around an oblong firing chamber 12. When the heating elements are positioned diagonally in this manner, as is apparent from FIG. 4B, it is preferred to arrange the long and hot side leg 44 of the heating elements adjacent to the firing chamber 12 and the cool and shorter side leg 42 remote from the firing chamber 12.

Figure 4C:
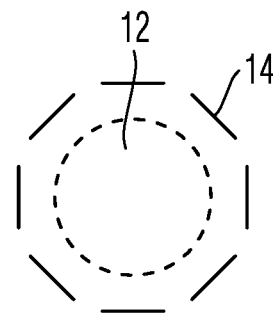

FIG. 4C shows a further embodiment of an inventive dental furnace. In this solution, eight heating elements 14 are arranged like an octagon around the circular or octagonal firing chamber 12.

Figure 4D:
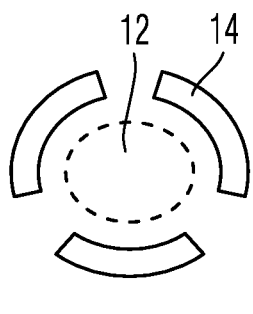

In the embodiment in accordance with FIG. 4D, every heating element 12 is bent in the top view. Bending is realized by a corresponding configuration of the arch leg 46. In this way, the firing chamber 12 is surrounded closely and extends elliptically or ovally.

Figure 4E:
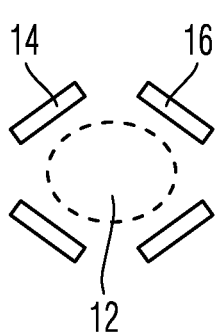

A rhombic heating element arrangement is apparent from FIG. 4E. In this solution, the firing chamber 12 may have, for instance, a trapezoidal cross section or may also be oval.

Figure 4F:
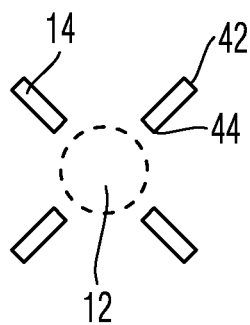

The embodiment according to FIG. 4F is suitable for the use of the asymmetric heating elements according to FIG. 3. There, the heating element arrangement is radial, for instance with four heating elements. Here, in turn, the longer side legs 44 face the firing chamber 12 and the shorter side legs 42 face away from the firing chamber 12.

The invention claimed is:

1. A dental furnace comprising
    a firing chamber (12) which is surrounded by a plurality of heating elements (14, 16) fabricated of molybdenum disilicide which give off heating energy to the firing chamber (12) in the dental furnace (10),
    wherein the heating elements (14, 16) are configured as electrical resistance heating elements and supported below the firing chamber (12) each by at least one heating element support foot (18), wherein the heating elements (14, 16) extend upright to a top starting from the heating element support feet (18) and at the top, end in an arch (46) without an upper lateral support, wherein a temperature gradient exists between the heating elements (14, 16) and the support feet (18) during operation of the dental furnace at operating temperatures between 1350° C. and 1650° C. with the heating support feet (18) being at a temperature colder than 800° C.

2. The dental furnace according to claim 1, wherein the dental furnace is a high temperature dental furnace for oxide ceramics, wherein the arch is a semicircular arch or a pointed arch, wherein the heating elements do not have upper lateral support at the top end of the arch.

3. A dental furnace comprising a firing chamber (12) which is surrounded by a plurality of heating elements fabricated of molybdenum disilicide which are intended to give off heating energy to the firing chamber (12) in the dental furnace (10), wherein the heating elements (14, 16) are configured as resistance heating elements and supported below the firing chamber (12) each by means of at least one heating element support foot (18), wherein a temperature gradient exists between the heating elements (14, 16) and the support feet (18) during operation of the dental furnace at operating temperatures between 1350° C. and 1650° C. with the heating element support feet (18) being at a temperature colder than 800° C., and wherein the heating elements (14, 16) each extend in the shape of a U which is turned upside down.

4. The dental furnace according to claim 3, wherein the heating element is pointed.

5. The dental furnace as claimed in claim 1, wherein in a top view, the heating elements (14, 16) are distributed around the circumference of the firing chamber (12) substantially in a ring-shaped manner and/or by forming a polygon.

6. The dental furnace as claimed in claim 5, wherein the heating element comprises 3 to 8 heating elements in number.

7. The dental furnace as claimed in claim 1, wherein the heating elements (14, 16) extend towards the top from the heating element support feet (18) over less than 10 cm.

8. The dental furnace as claimed in claim 1, wherein the firing chamber (12) comprises a height up to 120 mm and a diameter or a diagonal or a side length up to 100 mm, wherein the heating elements (14, 16) extend laterally next to the firing chamber to a height that is at least half the height or the entire height of the firing chamber.

9. The dental furnace as claimed in claim 1, wherein the heating elements (14, 16) each extend in the shape of a U which comprise, as a center leg of the U, a semicircular arch (46), having a radius that is at least 10 mm to 5 cm.

10. The dental furnace as claimed in claim 9, wherein the radius is more than three times a diameter of the heating elements.

11. The dental furnace as claimed in claim 1, wherein ends of the heating elements (14, 16) and associated upper ends of the heating element support feet (18) are vertically offset such that one lower end (leg 42) of a heating element is located higher than the other lower end (leg 44).

12. The dental furnace as claimed in claim 11, wherein the heating elements (14, 16) are disposed radially and wherein a lower end of the heating elements extends radially further on the inside and a higher end of the heating elements extends radially further on the outside.

13. The dental furnace as claimed in claim 1, wherein the heating element support feet (18) and the heating elements (14, 16) and transition areas (22) are fabricated of the same material and comprise different cross-sectional areas.

14. The dental furnace as claimed in claim 1, characterized in that the heating element support feet (18) and the heating elements have more than 2 diameter gradations, wherein the diameters increase from the top to the bottom.

15. The dental furnace as claimed in claim 1, wherein power electronics of the dental furnace (10) are disposed adjacent to the electrical connections (24) in the base of the dental furnace.

16. The dental furnace as claimed in claim 1, wherein the dental furnace (10) comprises control electronics configured to turn off the furnace after a cycle time of less than one hour.

17. The dental furnace as claimed in claim 1, wherein the dental furnace (10) comprises a charging base firing chamber bottom (20) which may be moved, relative to the heating elements (14, 16), from the bottom through the firing chamber (12) towards the top into a region close to the upper side of the dental furnace (10) to be charged with dental restorations.

* * * * *